United States Patent [19]

Sideris

[11] 3,806,637

[45] Apr. 23, 1974

[54] APPARATUS FOR RESOLVING PHASE AMBIGUITIES IN REGENERATED CARRIER SIGNALS

[75] Inventor: Sotirios I. Sideris, Des Plaines, Ill.

[73] Assignee: Hazeltine Research, Inc., Chicago, Ill.

[22] Filed: Oct. 30, 1972

[21] Appl. No.: 302,331

[52] U.S. Cl. ..................... 178/5.4 SY, 178/69.5 CB
[51] Int. Cl. ..................... H04n 5/38
[58] Field of Search . 178/5.4 SY, DIG. 23, 69.5 CB

[56] References Cited

UNITED STATES PATENTS

| | | | |
|---|---|---|---|
| 2,951,896 | 9/1960 | Schaefer | 178/5.4 SY |
| 3,673,320 | 6/1972 | Carnt et al. | 178/5.4 SY |
| 3,538,244 | 11/1970 | Carnt et al. | 178/69.5 CB |
| 3,493,674 | 2/1970 | Houghton | 178/DIG. 23 |
| 3,736,371 | 5/1973 | Krause | 178/5.4 SY |
| 2,820,091 | 1/1958 | Parker et al. | 178/5.4 SY |

*Primary Examiner*—Albert J. Mayer

[57] ABSTRACT

Disclosed is an apparatus which resolves phase ambiguities created in regenerating an add-on signal carrier in a system where the add-on signal and the TV signal are transmitted and received over the same frequency band in a suppressed carrier format and where the add-on signal carrier is regenerated from the transmitted information itself, thus creating a phase ambiguity. In a specific embodiment the apparatus utilizes a reference burst signal transmitted during the vertical blanking interval of the TV signal and having a phase and frequency which is representative of the carrier of the add-on signal. In the receiver this reference burst is compared with the regenerated add-on carrier and if any difference in phase is determined, logic circuitry is activated to resolve this difference and provide an output regenerated carrier signal free from the phase ambiguity and useful in detecting the add-on information.

11 Claims, 9 Drawing Figures

APPARATUS FOR RESOLVING PHASE AMBIGUITIES IN REGENERATED CARRIER SIGNALS

CROSS-REFERENCE TO RELATED APPLICATIONS

This invention relates to add-on TV systems such as are disclosed in B.D. Loughlin's simultaneously filed copending application, Ser. No. 302,333 entitled "System for Transmission of Auxiliary Information in a Video Spectrum" which is assigned to the same assignee as the present application.

BACKGROUND OF THE INVENTION

Add-on systems of the type disclosed in the above-mentioned copending applications provide an add-on signal and a TV signal compatibly transmitted and received over the same frequency band. In such systems the add-on signal is transmitted on a separate carrier from the TV signal and this add-on signal is transmitted in a suppressed carrier format. In the prior art several techniques for regenerating suppressed carrier signals exist. One of these is presently used to regenerate the color subcarrier on the TV signal, namely, a local oscillator contained in the receiver tuned approximately to the carrier signal frequency and locked to the exact frequency by a color reference burst signal transmitted during every horizontal blanking interval. The relatively short duration of this blanking interval and the high probability of oscillator drift makes it necessary to transmit this type of reference burst during every horizontal blanking interval. This technique would not be useful, therefore, for regenerating the add-on signal carrier because of the disadvantage of having to provide a second reference burst signal which also occurs during every horizontal blanking interval, further crowding this limited space and requiring changes in FCC Regulations as well as in the existing TV signals.

A second possible technique is to transmit add-on information on a carrier signal which is related in frequency to the existing color subcarrier frequency and therefore which can be derived by multiplying the regenerated color subcarrier by a fractional number. This approach also has its limitations, since the multiplication and division processes necessary to produce the regenerated add-on carrier cause a phase ambiguity (i.e. a question as to whether the signal is of the correct phase or not) in the resultant signal, which must be resolved in order to provide a regenerated carrier signal which is suitable for detecting the add-on information. The extent of this phase ambiguity depends on the number of times which the color subcarrier must be divided to produce the add-on carrier frequency. For example, if the add-on carrier signal were originally generated to be 7/10ths of the color subcarrier frequency, the phase of the resultant regenerated add-on carrier could have any one of ten different values (one for each division required). This approach, while providing the advantage of a continuous add-on subcarrier presents a complex phase ambiguity problem which may be solved according to one aspect to the invention described hereinafter.

For purposes of this invention however, an advantageous approach to regenerating the add-on carrier is to regenerate it from the received add-on signal itself. This can be accomplished by squaring the received add-on signal which, as is well known in the art, will produce a signal representative of the second harmonic of the add-on signal carrier (even though the carrier is suppressed during transmission). This second harmonic can then be divided in half to produce an add-on carrier signal of the proper frequency, but, as in the previous example, having a phase ambiguity. In this case, however, the regenerated signal has only one of two possible phases, namely, zero or 180° (a bi-phase ambiguity) and therefore presents a somewhat less difficult problem to solve.

It is therefore an object of the invention to provide an apparatus which resolves phase ambiguities created in regenerating an add-on carrier signal from the received suppressed carrier add-on signal itself.

It is a further object of the invention to provide such an apparatus which resolves a bi-phase ambiguity created when the add-on carrier signal is regenerated by squaring the received signal and dividing the resulting second harmonic signal in half.

It is a still further object of the invention to provide such an apparatus which is compatible with existing TV signals and does not materially interfere with the already crowded horizontal blanking interval.

It is a still further object of the invention to provide such an apparatus which minimizes the circuitry added to existing TV transmitters and receivers and is simple and inexpensive to install.

In accordance with the invention there is provided for use in a system for compatibly transmitting and receiving both a TV and a suppressed carrier add-on signal within the frequency band normally occupied by the TV signal alone, an apparatus for resolving phase ambiguities created in regenerating the add-on carrier signal. The apparatus includes means for supplying a TV signal, and means for supplying an add-on signal, compatible with the TV signal, and representative of selected add-on information modulated on an add-on carrier signal. Also included is means for generating a reference burst signal having a predetermined amplitude and representative of the phase and frequency of the add-on carrier signal. These signals are combined and transmitted to a remote receiver and the add-on signal is transmitted in a suppressed carrier format. The receiver includes means responsive to the received combined signal for developing a regenerated add-on carrier signal having selectable phases. Still further included is means, jointly responsive to the reference burst in the received combined signal, and the regenerated add-on carrier signal, for determining the phase relationship between the regenerated add-on carrier signal, and the originally supplied add-on carrier signal, and in response to a predetermined phase relationship, the phase for the regenerated add-on carrier signal which is identical to the phase of the originally supplied add-on carrier signal is selected. This provides an output regenerated add-on carrier signal free from phase ambiguities and suitable for use in detecting the add-on information.

For a better understanding of the present invention, together with other and further objects thereof, reference is had to the following description taken in connection with the accompanying drawings and its scope will be pointed out in the appended claims.

DESCRIPTION OF THE DRAWINGS

FIGS. *3a* through *3f* are graphical illustrations of signals such as are typical in the embodiment of FIG. 2.

DESCRIPTION AND OPERATION OF THE EMBODIMENT OF FIG. 1

In the aforementioned copending applications there are described systems for compatibly transmitting and receiving a combined add-on and TV signal over a frequency band occupied by the TV signal alone. In these systems it is desirable to provide add-on information modulated on an add-on signal carrier which is distinct from the TV signal carrier and which is suppressed during transmission of the add-on signal in order to conserve power. As previously stated, to recover the transmitted add-on information in this type of system it is necessary to regenerate the add-on signal carrier for use in synchronously detecting the add-on signal modulation. The most advantageous method of developing a regenerated add-on carrier signal is to develop it directly from the received add-on signal itself. One method for accomplishing this has previously been described, namely, to develop a signal representative of the harmonic of the original add-on carrier signal and then to divide this harmonic signal to produce a signal representative of the frequency of the original add-on carrier signal. Since this division process necessarily produces one or more phase ambiguities, in order for this type of system to be useful, these phase ambiguities must be resolved. The invention herein described therefore employs a novel method for resolving these phase ambiguities by combining with the aforementioned TV and add-on signal prior to transmission, a reference burst signal which has a predetermined amplitude and is representative of the phase and frequency of the originally supplied add-on carrier signal and thus is useful resolving any phase ambiguity which may arise in developing the regenerated add-on carrier signal.

Figure 1:
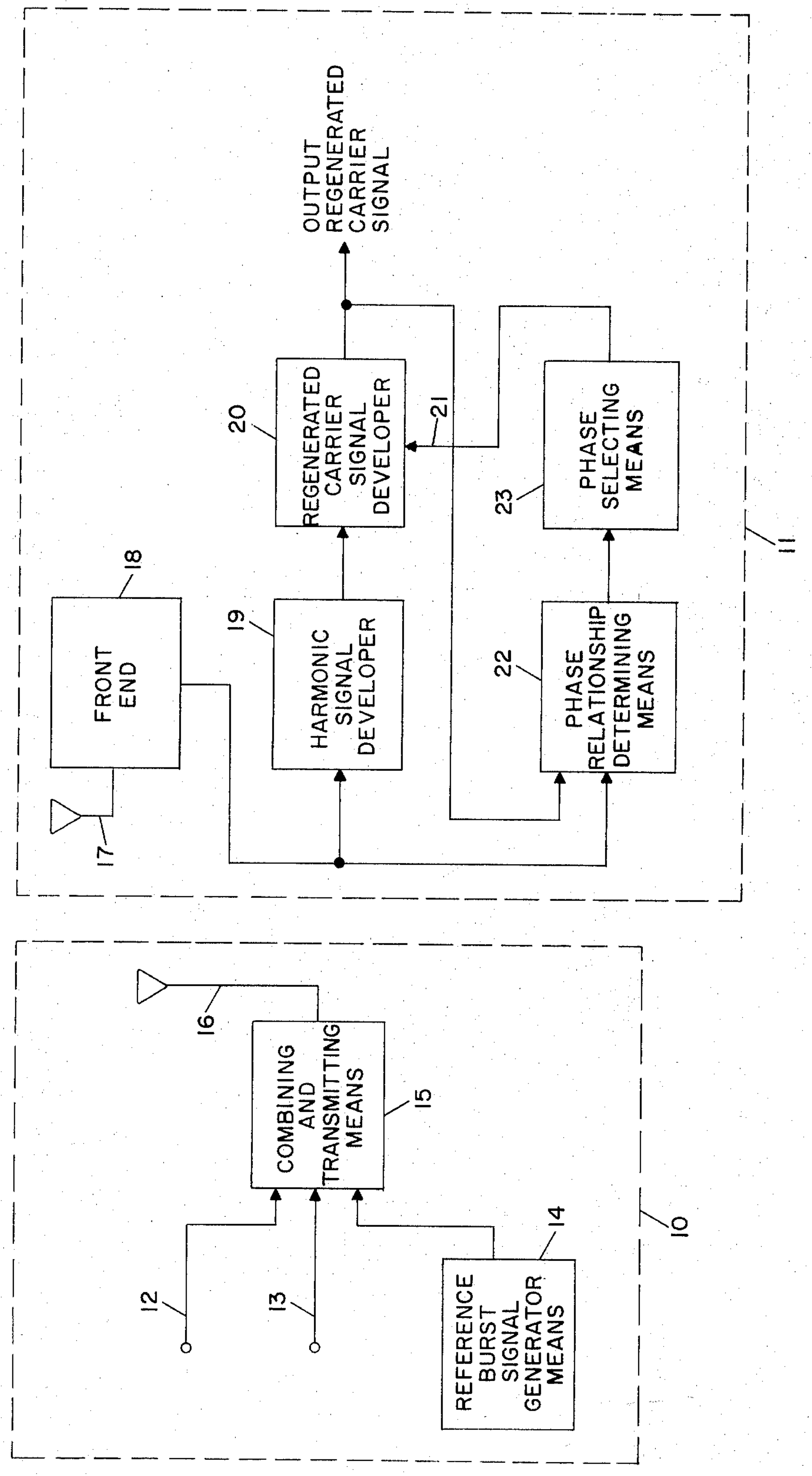
FIG. 1 is a block diagram of an embodiment of the invention including transmitter and receiver portions.

Referring now to FIG. 1 there is shown in block form an embodiment of the invention which comprises a transmitter portion 10 which transmits the combined add-on, TV, and reference burst signal of the type herein described to a receiver portion 11. Transmitter 10 includes means, shown as an input lead 12, for supplying a conventional TV signal, which may be either color or black and white and may be generated in any manner well known in the art. Further included is means, shown as input lead 13, for supplying an add-on signal, compatible with the supplied TV signal, and representative of selected add-on information modulated on an add-on carrier signal. Add-on signals and method for generating them to be compatible with TV signals occupying the same frequency band are described in the aforementioned copending applications, however, it will be recognized by those skilled in the art that the invention herein described is useful in any add-on system in which it is necessary to develop a regenerated add-on carrier signal from a suppressed carrier add-on signal.

Shown as block 14 is means for generating the reference burst signal. This reference burst signal is generated to be representative of the phase and frequency of the add-on carrier signal. It is preferably generated during a blanking interval of the TV signal so that its amplitude can be made relatively high with respect to the amplitude of the supplied add-on and TV signals and yet it will not interfere with video information contained in the TV signal, since none occurs during blanking intervals. This reference burst signal may be transmitted as often as needed in order to improve unambiguous regeneration of the add-on carrier signal. However, receiving apparatus 11 described hereinafter is adapted to operate with a reference burst signal occurring approximately once every TV field. This enables the reference burst signal to occur only during the vertical blanking interval of the TV signal, which leaves the horizontal blanking intervals uncrowded by additional signals. Alternatively the reference burst signal may be generated during one of the horizontal blanking intervals of each field, leaving uncrowded the remaining horizontal blanking intervals. To establish which portion of the TV signal the reference burst will occur in means 14 may include a line recognizer, (not illustrated) similar to those described with respect to FIGS. 2 and 4, which in response to the occurrence of a particular horizontal and vertical synchronization pulse enables generation of the reference burst.

These three signals, add-on, TV, and reference burst are then supplied to block 15 which comprises means for combining and for transmitting all three signals to a receiver portion 11. Those skilled in the art will recognize that such combining and transmitting may take place in any manner and in any order which is convenient for the particular application involved. For example, in conventional color TV systems suppressed carrier transmission is commonly used for transmitting the chrominance subcarrier. Therefore in a simple form means 15 may include the existing transmitter of a conventional TV system modified to accept the add-on signal and reference burst signal and to transmit all three signals through antenna 16. Alternatively means 15 may include separate transmitters for the TV and the add-on signal or for all three signals, allowing the combination to take place in the medium of transmission.

Turning now to receiver portion 11 which is shown in block form in FIG. 1. Antenna 17 in combination with conventional front end circuitry 18, receives the combined add-on, TV and reference burst signal and supplies it to harmonic signal developer 19 which develops a signal proportional to a selected harmonic of the add-on carrier signal frequency. This signal is, in turn, supplied to regenerated carrier signal developer 20 which divides the harmonic signal supplied to it, down to the frequency which is representative of the suppressed add-on carrier signal frequency. Since, as previously stated, the signal will, as a result of the division, contain a phase ambiguity for each division required, block 20 is adapted to supply a regenerated carrier signal having selectable phases, the selection of which is controlled by input lead 21 which although shown as a single wire may comprise a number of wires as will be apparent hereinafter. Blocks 19 and 20 together comprise means responsive to the received combined signal for developing a regenerated add-on carrier signal having selectable phases. If block 19 develops a signal representative of the second harmonic of the add-on carrier signal as is most practical then block 20 need only supply a regenerated carrier signal whose phase is selectable between two values, 0° and 180°, since the resulting phase ambiguity will simply be a bi-phase ambiguity. On the other hand, if harmonic signal developer 19 develops a signal proportional to the third harmonic of the add-on signal carrier frequency then block 20 must develop a regenerated carrier signal whose phase is selectable between three values, 0°, 120° and 240°. The regenerated carrier signal is supplied to block 22 which also accepts the received combined signal from antenna 17.

Block 22 comprises means jointly responsive to the reference burst in the received combined signal and the regenerated add-on carrier signal for determining the phase relationship between the regenerated add-on carrier signal and the originally supplied add-on carrier signal. This is easily accomplished since the reference burst signal has a phase which is representative of the add-on carrier signal phase. Therefore, by comparing the phase of the reference burst with the phase of the regenerated carrier supplied by block 20 the phase relationship between the signal supplied by block 20 and the original add-on carrier signal can be determined even though the original add-on carrier signal was suppressed during transmission. A signal representative of this phase relationship is then supplied to block 23 which comprises means responsive to a predetermined phase relationship for selecting the phase for the regenerated add-on carrier signal which is identical to the phase of the originally supplied add-on carrier signal. For example, assume that the reference burst signal was generated to have a phase identical to the originally supplied add-on carrier signal (although this is not necessary), and further assume that block 19 develops a signal proportional to the second harmonic of the originally supplied add-on carrier signal, in this case block 20 will supply a regenerated carrier signal whose phase is selectable between two values 0° and 180°. Block 22 will compare the phase of the received reference burst signal with the phase of the regenerated carrier signal. If these phases are identical, indicating that the regenerated carrier signal supplied by block 20 has an identical phase to the original add-on carrier signal, then the signal supplied to block 23 will not cause any change in the output signal of block 20. This output signal is then suitable for use in synchronously detecting the received add-on information. On the other hand, if block 22 indicates that there is 180° phase difference between the reference burst signal and the regenerated carrier signal, then phase selecting means 23 in response to this difference will generate a signal, supplied by lead 21, which will cause block 20 to select the alternate phase for its regenerated carrier signal, thus insuring that its output is in phase with the reference burst and therefore with the original add-on carrier signal. Since, once the correct phase for the regenerated carrier is selected it remains correct for as long as the add-on signal is continuously received, transmission of the reference burst signal may be limited to a minimum of occurrences, and while it is suggested that this transmission be once every TV field during the vertical blanking interval those skilled in the art will recognize that reference burst signals may be transmitted at an even lesser rate.

DESCRIPTION AND OPERATION OF THE EMBODIMENT OF FIG. 2

Figure 2:
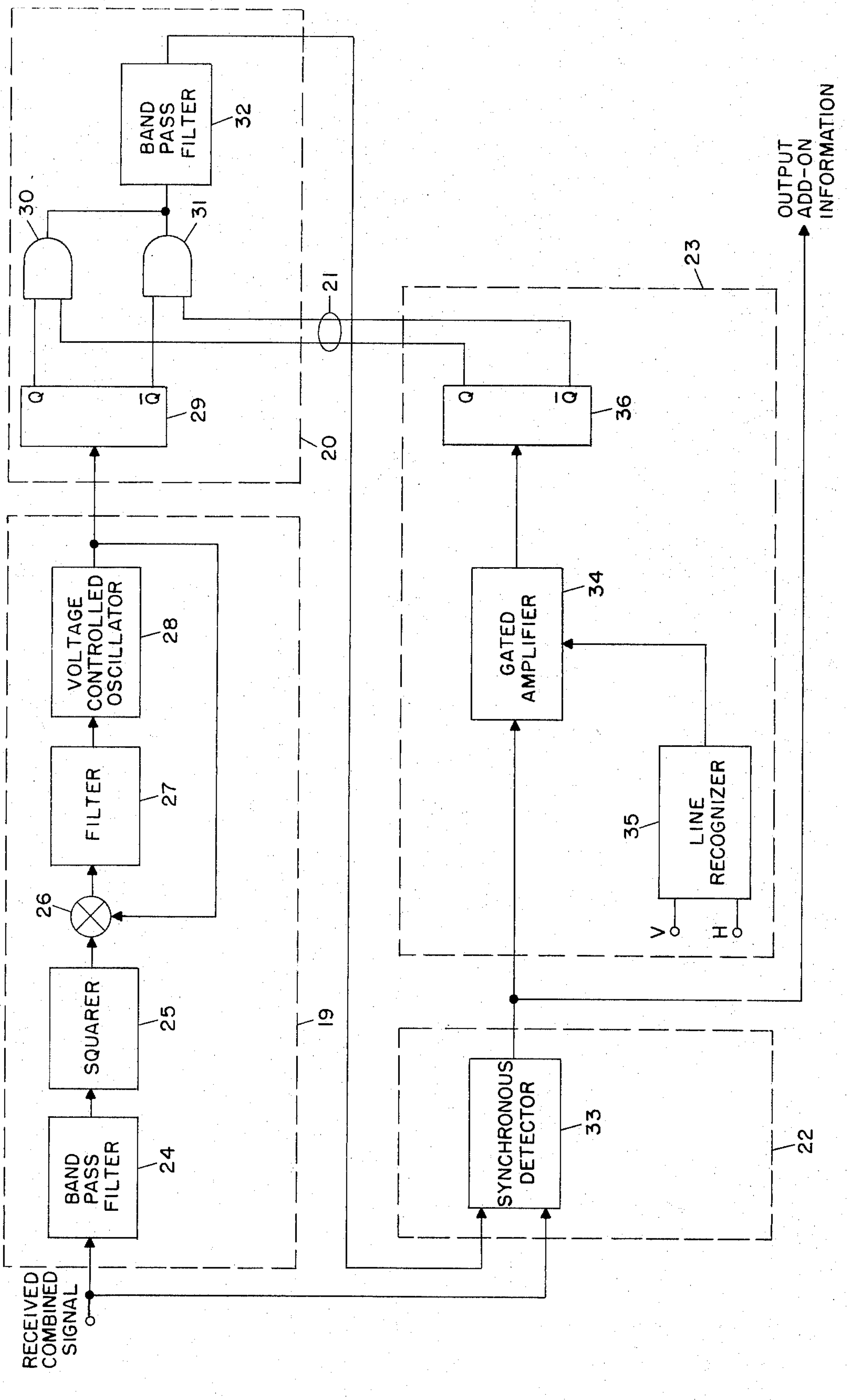
FIG. 2 is a block diagram of a specific receiver portion useful in the embodiment of FIG. 1.
Figure 3:
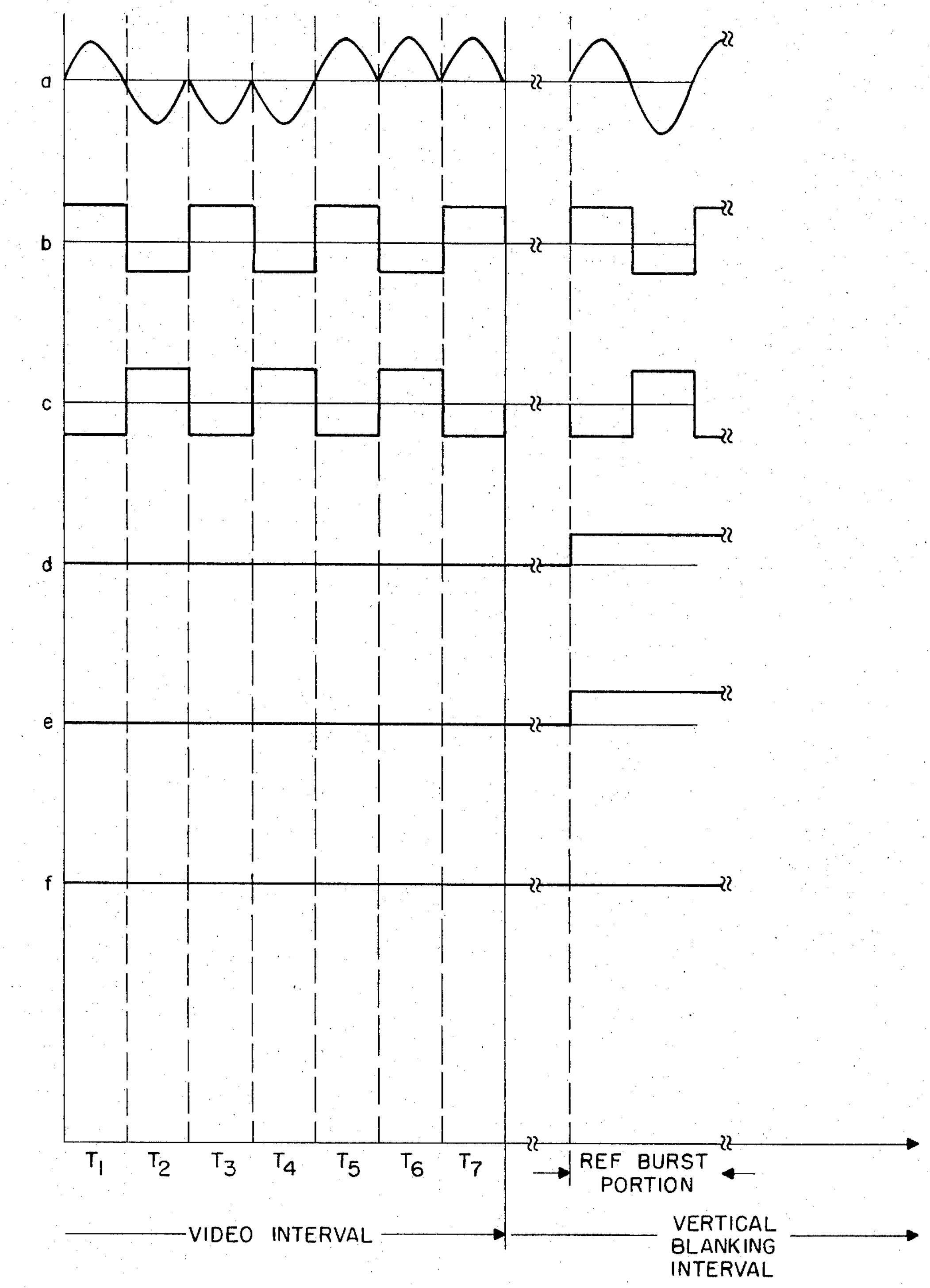

In FIG. 2, there is shown a more specific embodiment of receiver portion 11 which is especially useful in a combined TV and add-on signal transmission and reception system such as those described in the aforementioned copending applications. Dotted boxes 19, 20, 22 and 23 correspond to the like numbered blocks in FIG. 1 and serve basically the same function. The received combined signal from front end 18 is supplied as in FIG. 1 to both harmonic signal developer 19 and phase relation determining means 22. Within box 19 bandpass filter 24 accepts the received combined signal and passes only the add-on signal portion of the frequency band. An example of portions of a phase modulated add-on signal occurring during the video and vertical blanking intervals of the TV signal is shown in FIG. 3*a*. It will be noted that during the vertical blanking interval a reference burst signal occurs which has a phase and frequency representative of the phase and frequency of the suppressed add-on signal carrier originally supplied in the transmitter 10. It will be recognized that this reference burst signal may contain many cycles of add-on carrier although only slightly more than one is illustrated. The received signal is then supplied to a squarer circuit 25 which produces several signals, each representative of a harmonic of the original add-on carrier signal. The harmonic signals are then supplied to a phase and frequency locked loop which consists of mixer 26, filter 27 and voltage controlled oscillator 28 whose output is supplied both to regenerated carrier signal developer 20 and to the second input of mixer 26. The phase and frequency locked loop has a characteristic of selecting an input signal of a specific frequency and locking on to it so that its output remains exactly the frequency of that input signal regardless of minor variations in the input. In this case the voltage controlled oscillator 28 is tuned approximately to the frequency of the second harmonic of the original add-on carrier. Therefore, when this output signal is combined in mixer 26 with the second harmonic signal provided by squarer 25 and filtered through filter 27 any differences between tee frequencies causes a control voltage to be generated which in turn causes the frequency of oscillator 28 to change by an amount equal to the frequency difference. This locks oscillator 28 to exactly the frequency of the second harmonic of the originally supplied add-on carrier signal without the need for a transmitted burst signal occurring every horizontal blanking interval, as in one prior art method.

In box 20 the second harmonic signal is supplied to flip-flop 29 whose function is to divide the signal into a pair of signals whose frequencies are each one half the frequency of the second harmonic signal. Therefore on both the Q and Q outputs of the flip-flop there are developed signals representative of the frequency of the originally supplied add-on carrier signal but differing in phase by 180°. FIG. 3*b* shows an example of a signal such as might appear on the Q side of flip-flop 29 and FIG. 3*c* shows a second signal identical to the first except differing in phase by 180° such as might appear on the Q side of flip-flop 29. As previously stated it is an object of this invention to select the one of these two signals which is identical in phase to the originally supplied add-on signal carrier. In order to do so each of these signals is supplied to logic circuitry which consists of AND gates 30 and 31 whose outputs are tied together. The other two inputs to AND gates 30 and 31 are supplied by phase selecting means 23. As will be described hereinafter means 23 provides an enable input on only one of the two inputs. Thus if AND gate 30 is enabled then the signal from the Q side of flip-flop 29 is selected and will be supplied to bandpass filter 32, and if on the other hand AND gate 31 is enabled, then the signal from the Q side of flip-flop 29 is selected and supplied to bandpass filter 32. Bandpass filter 32 shapes the regenerated carrier signal to put it in a form suitable for synchronous detection of the originally received add-on signal.

This regenerated add-on carrier signal whether of the correct or incorrect phase is also supplied to phase relationship determining means 22, which in this case is a synchronous detector 33 also used to detect the add-on signal information in the received combined signal. The regenerated carrier signal supplied by filter 32 is beat in synchronous detector 33 with the received combined signal to produce an output signal representative of the information contained in the add-on portion of the received combined signal in a manner well known in the art. However during the vertical blanking interval portion of the TV signal in which the aforementioned reference burst signal occurs it is this reference burst which is beat against the regenerated add-on carrier signal. If the phase of these two signals are the same, the output of the synchronous detector 33 is of a first state. If the phase of these two signals are different, then the output of synchronous detector 33 is of a different state.

This output of detector 33 herein called a control signal, is supplied to gated amplifier 34 in phase selecting means 23. Gated amplifier 34 is only enabled by line recognizer 35 during the portion of the vertical blanking interval in which the reference burst occurs. An enable signal such as provided by line recognizer 35 is shown in FIG. 3*d*. This prevents flip-flop 36 from being activated except during the reference burst portion of the vertical blanking interval. In this manner selection between AND gate 30 and AND gate 31 is accomplished since AND gate 30 is connected to the Q side of the flip-flop 36 and AND gate 31 is connected to the Q side of the flip-flop 36. The state of the flip-flop 36 then controls which ever of the two gates is enabled and therefore which phase of the regenerated add-on carrier signal will be supplied to bandpass filter 32. For example, if the control signal from detector 33 indicates that there is a 180° phase difference between the regenerated add-on carrier signal and the reference burst signal (assuming the reference burst is of the same phase as the original add-on signal carrier) such as shown in FIG. 3*e*, then flip-flop 36 will change its state activating whichever gate between AND gate 30 and 31 was not originally activated and therefore changing the phase of the output of box 20 by 180°. If on the other hand the control signal supplied to the flip-flop 36 indicates that there is no difference in phase between the regenerated carrier signal and the reference burst signal, such as is shown in FIG. 3*f*, then flip-flop 36 will not change its state, allowing whichever of the two phases was supplied by box 19 to remain as its output. Once the proper phase for the regenerated add-on carrier signal is selected, it is continually supplied to synchronous detector 33 whose output then represents the add-on information contained in the original received signal, even though the add-on carrier signal was suppressed when transmitted.

DESCRIPTION AND OPERATION OF THE EMBODIMENT OF FIG. 4

Figure 4:
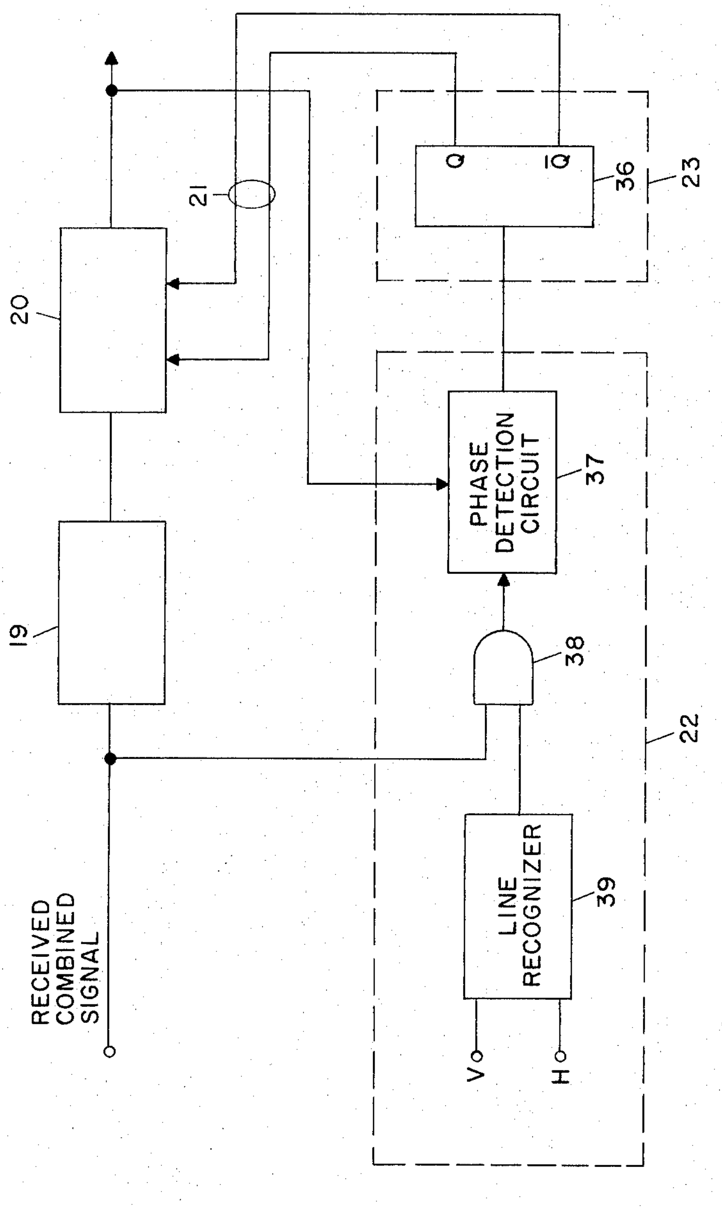
FIG. 4 is an alternate specific receiver portion also useful in the embodiment of FIG. 1.

If it is not desirable to use the synchronous detector 33 of FIG. 2 to provide the aforementioned control signal, an alternate method for determining the phase relationship between the add-on signal and the regenerated carrier signal is shown in FIG. 4. In this embodiment blocks 19 and 20 represent the same circuitry as they did in FIG. 2 and therefore are not shown in detail. The output of block 20 still represents the regenerated add-on signal carrier which is selectable between two phases 0° and 180°. In this case however phase relationship determining means 22 which develops the control signal at its output includes a phase detection circuit 37 which compares the reference burst signal to the regenerated add-on carrier signal and produces a control signal proportional to any phase differences therebetween. This reference burst signal is supplied to the phase detection circuit through AND gate 38 which is supplied with the received combined signal and is activated by line recognizer 39 (similar in function to line recognizer 35) during the occurrence of the reference burst portion of the combined signal. In this case phase selection means 23 which receives the control signal may simply include flip-flop 36 for activating (through wires 21) the appropriate AND gate in block 20.

It will be recognized by those skilled in the art that other variations of the logic circuitry disclosed herein may be employed in order to suit a particular purpose. Since the flip-flops and AND gates herein described are used as switches and enabling circuits it would be obvious to those skilled in the art to replace these circuits by equivalent logic circuitry which is different in structure but accomplishes a similar function.

While there has been described what is at present considered to be the preferred embodiment of this invention, it will be obvious to those skilled in the art that various changes and modifications may be made therein without departing from the invention.

What is claimed is:

1. In a system for compatibly transmitting and receiving both a color TV signal and a suppressed carrier add-on signal within the frequency band normally occupied by the color TV signal alone, an apparatus for resolving phase ambiguities created in regenerating the add-on carrier signal, comprising:

means for supplying a color TV signal;

means for supplying an add-on signal, compatible with said color TV signal, and representative of selected add-on information modulated on an add-on carrier signal;

means for generating a reference burst signal having a predetermined amplitude and representative of the phase and frequency of said add-on carrier signal;

means for combining said color TV, said add-on, and said reference burst signals and for transmitting the combined signal for reception at a remote receiver, said add-on signal being transmitted in a suppressed carrier format;

means for receiving said combined signal;

means, responsive to the add-on signal component of said received combined signal, for developing a regenerated add-on carrier signal having at least two discrete selectable phases;

means, jointly responsive to the reference burst component in said received combined signal and the regenerated add-on carrier signal, for determining the phase relationship between said regenerated add-on carrier signal and said originally supplied add-on carrier signals and for supplying a signal representative of said phase relationship;

and means, responsive to said signal supplied by said phase determining means, for selecting one of said discrete selectable phases for said regenerated add-on carrier signal which is identical to the phase of said originally supplied add-on carrier signal, thereby providing an output add-on carrier signal free from phase ambiguities and suitable for use in detecting add-on information in said received combined signal.

2. In a system for compatibly transmitting and receiving both a color TV signal and a suppressed carrier add-on signal within the frequency band normally occupied by the TV signal alone, an apparatus for resolving phase ambiguities created in regenerating the add-on carrier signal, comprising:

means for supplying a color TV signal;

means for supplying an add-on signal, compatible with said color TV signal, and representative of selected add-on information modulated on an add-on carrier signal;

means for generating a reference burst signal, occurring during a selected blanking interval of said TV signal and having a predetermined amplitude and a phase and frequency representative of the phase and frequency of said add-on carrier signal;

means for combining said color TV, said add-on, and said reference burst signals and for transmitting the combined signal for reception at a remote receiver said add-on signal being transmitted in a suppressed carrier format;

means for receiving said combined signal;

means, responsive to the add-on signal component of said received combined signal, for developing a regenerated add-on carrier signal having first and second selectable phases differing by 180°;

means, jointly responsive to the reference burst component in said received combined signal and the regenerated add-on carrier for developing a control signal whose state is representative of the phase difference between said regenerated add-on carrier signal, and said originally supplied add-on carrier signal;

and means, responsive to said control signal state, for selecting the one of said phases for said regenerated add-on carrier signal which is identical to the phase of said originally supplied add-on carrier signal thereby providing an output add-on carrier signal free from phase ambiguities and suitable for use in detecting said add-on information in said received combined signal.

3. Apparatus in accordance with claim 2 wherein said control signal developing means comprises a phase detection circuit which determines said phase difference and which provides said control signal in a first state, indicating that said reference burst signal and said originally supplied add-on carrier signal are in phase, and in a second state, indicating that said reference burst signal and said originally supplied add-on carrier signal are 180° out of phase;

and wherein said phase selecting means comprises digital logic circuitry which, in response to a control signal of said second state and the occurrence of said blanking interval, changes the phase selected for said regenerated add-on carrier signal, and in response to a control signal of said first state and the occurrence of said blanking interval, leaves unchanged the phase selected for said regenerated add-on carrier signal.

4. Apparatus in accordance with claim 2 wherein said control signal developing means comprises a synchronous detector which combines said regenerated add-on carrier signal and said reference burst signal to provide said control signal in a first state indicating that said originally supplied add-on carrier signal and said reference burst signal are in phase and in a second state indicating that said originally supplied add-on carrier signal and said reference burst signal are 180° out of phase;

and wherein said phase selecting means comprises digital logic circuitry which, in response to a control signal of said second state and the occurrence of said blanking interval, changes the phase selected for said regenerated add-on carrier signal, and in response to a control signal of said first state and the occurrence of said blanking interval, leaves unchanged the phase selected for said regenerated add-on signal.

5. A receiver for use in an apparatus for resolving phase ambiguities created in regenerating an add-on carrier signal in a system wherein a color TV signal is combined with an add-on signal containing add-on information modulated on a supplied add-on carrier signal, and a reference burst signal representative of the phase and frequency of said supplied add-on carrier signal and the combination is transmitted and received within the frequency band normally occupied by the color TV signal alone, said add-on signal being transmitted in a suppressed carrier format, comprising:

means for receiving said combined signal;

means responsive to the add-on signal component of said received combined signal for developing a regenerated add-on carrier signal having at least two discrete selectable phases;

means, jointly responsive to the reference burst component in said received combined signal and the regenerated add-on carrier signal, for determining the phase relationship between said regenerated add-on carrier signal and said originally supplied add-on carrier signal and for supplying a signal representative of said phase relationship;

and means, responsive to said signal supplied by said phase determining means for selecting one of said discrete selectable phases for said regenerated add-on carrier signal which is identical to the phase of said originally supplied add-on carrier signal, thereby providing an output add-on carrier signal free from phase ambiguities and suitable for use in detecting said add-on information in said received combined signal.

6. A receiver for use in an apparatus for resolving phase ambiguities created in regenerating an add-on carrier signal in a system wherein a color TV signal is combined with an add-on signal containing add-on information modulated on a supplied add-on carrier signal, and a reference burst signal representative of the phase and frequency of said supplied add-on carrier signal and occurring during a selected blanking interval of said color TV signal and the combination is transmitted and received within the frequency band normally occupied by said color TV signal alone, said add-on signal being transmitted in a suppressed carrier format, comprising:

means for receiving said combined signal;

means, responsive to the add-on signal component of said received combined signal, for developing a regenerated add-on carrier signal having first and second selectable phases differing by 180°;

means, jointly responsive to the reference burst component in said received combined signal and the regenerated add-on carrier signal, for developing a control signal whose state is representative of the phase difference between said regenerated add-on carrier signal, and said originally supplied add-on carrier signal;

and means, responsive to said control signal state, for selecting the one of said phases for said regenerated add-on carrier signal which is identical to the phase of said originally supplied add-on carrier signal thereby providing an output add-on carrier signal, free from phase ambiquities and suitable for use in detecting said add-on information in said received combined signal.

7. Apparatus in accordance with claim 6 wherein said control signal developing means comprises a phase detection circuit which determines said phase difference and which provides said control signal in a first state, indicating that said reference burst signal and said originally supplied add-on carrier signal are in phase, and in a second state, indicating that said reference burst signal and said originally supplied add-on carrier signal are 180° out of phase;

and wherein said phase selecting means comprises digital logic circuitry which, in response to a control signal of said second state and the occurrence of said blanking interval, changes the phase selected for said regenerated add-on carrier signal, and in response to a control signal of said first state and the occurrence of said blanking interval, leaves unchanged the phase selected for said regenerated add-on carrier signal.

8. Apparatus in accordance with claim 6 wherein said control signal developing means comprises a synchronous detector which combines said regenerated add-on carrier signal and said reference burst signal to provide said control signal in a first state indicating that said originally supplied add-on carrier signal and said reference burst signal are in phase and in a second state indicating that said originally supplied add-on carrier signal and said reference burst signal are 180° out of phase;

and wherein said phase selecting means comprises digital logic circuitry which, in response to a control signal of said second state and the occurrence of said blanking interval, changes the phase selected for said regenerated add-on carrier signal, and in response to a control signal of said first state and the occurrence of said blanking interval, leaves unchanged the phase selected for said regenerated add-on signal.

9. Apparatus in accordance with claim 8 wherein said selected blanking interval is the vertical blanking interval.

10. Apparatus in accordance with claim 9 wherein said regenerated add-on carrier signal developing means comprises:

means responsive to the add-on signal component of said received combined signal, for generating a signal representative of the second harmonic of said originally supplied add-on carrier signal;

means for dividing said second harmonic signal into a pair of generated add-on carrier signals differing in phase by 180°;

and each representative of the frequency of said originally supplied add-on carrier signal.

11. Apparatus in claim 10 wherein said second harmonic signal generating means comprises:

means for filtering said received combined singal to pass add-on signal frequencies and reject unwanted frequencies of said TV signal;

means for squaring said filtered signal to generate a plurality of harmonic singals;

and a phase and frequency locked tuned approximately to said second harmonic frequency for selecting said second harmonic signal from said plurality of harmonic signals and for supplying a signal representative of said second harmonic frequency to said dividing means.

* * * * *

UNITED STATES PATENT OFFICE
CERTIFICATE OF CORRECTION

Patent No. 3,806,637 Dated April 23, 1974

Inventor(s) Sotirios I. Sideris

It is certified that error appears in the above-identified patent and that said Letters Patent are hereby corrected as shown below:

In the claims, Column 9, line 65, "reference burst" should read -- regenerated add-on carrier --; line 67, "reference burst" should read -- regenerated add-on carrier --.

Column 10, lines 17 and 18, "reference burst" should read -- regenerated add-on carrier --; line 20, "reference burst" should read -- regenerated add-on carrier --.

Column 11, line 33, "reference burst" should read -- regenerated add-on carrier --; line 35, "reference burst" should read -- regenerated add-on carrier --.

Column 12, lines 5 and 6, "reference burst" should read -- regenerated add-on carrier --; line 8, "reference burst" should read -- regenerated add-on carrier --.

Signed and sealed this 22nd day of October 1974.

(SEAL)
Attest:

McCOY M. GIBSON JR.
Attesting Officer

C. MARSHALL DANN
Commissioner of Patents